United States Patent
Vassar et al.

(10) Patent No.: US 6,968,367 B1
(45) Date of Patent: Nov. 22, 2005

(54) METHOD AND APPARATUS FOR A DISTRIBUTED CALL SERVICING COMMUNITY

(75) Inventors: C. Philip Vassar, Tigard, OR (US); Kenneth L. Keeler, Hillsboro, OR (US); Dimitriy Itkis, Portland, OR (US)

(73) Assignee: ITXC IP Holdings, S.A.R.L., Luxembourg (LU)

( * ) Notice: Subject to any disclaimer, the term of this patent is extended or adjusted under 35 U.S.C. 154(b) by 446 days.

(21) Appl. No.: 09/694,714

(22) Filed: Oct. 23, 2000

(51) Int. Cl.[7] ............................................. G06F 13/00
(52) U.S. Cl. ...................... 709/219; 709/202; 709/223; 709/227
(58) Field of Search ................................ 709/202, 203, 709/206, 217, 219, 226, 227, 229, 238, 329, 709/223

(56) References Cited

U.S. PATENT DOCUMENTS

| | | | |
|---|---|---|---|
| 5,884,032 A * | 3/1999 | Bateman et al. ............ 709/224 |
| 6,130,933 A * | 10/2000 | Miloslavky .............. 379/90.01 |
| 6,173,052 B1 * | 1/2001 | Brady ........................ 379/265 |
| 6,226,365 B1 * | 5/2001 | Mashinsky ............. 379/114.02 |
| 6,282,278 B1 * | 8/2001 | Doganata et al. ...... 379/202.01 |
| 6,338,081 B1 * | 1/2002 | Furusawa et al. ........... 709/202 |
| 6,366,575 B1 * | 4/2002 | Barkan et al. .............. 370/352 |
| 6,404,747 B1 * | 6/2002 | Berry et al. ................ 370/270 |
| 6,449,260 B1 * | 9/2002 | Sassin et al. ............... 370/270 |
| 6,496,580 B1 * | 12/2002 | Chack .................... 379/266.01 |
| 6,601,041 B1 * | 7/2003 | Brown et al. ................. 705/14 |
| 6,624,827 B1 * | 9/2003 | Hwang et al. .............. 345/753 |
| 6,714,643 B1 * | 3/2004 | Gargeya et al. ........ 379/266.06 |
| 2002/0062334 A1 * | 5/2002 | Chen et al. ................. 709/200 |
| 2004/0073670 A1 * | 4/2004 | Chack ........................ 709/225 |

* cited by examiner

*Primary Examiner*—Viet D. Vu
(74) *Attorney, Agent, or Firm*—Kaplan & Gilman, LLP

(57) ABSTRACT

An apparatus is provided with a storage medium having stored therein programming instructions that implement a set of communication services for receiving on behalf of a plurality of offeror content providers within a call service community, an indication from an offeree acknowledging acceptance of an offer to provide assistance presented to the offeree by one of the plurality of offeror content providers. In one embodiment, independent agents selectively facilitate assisting offerees based at least in part upon certain attributes specific to the offer and/or the offeree.

53 Claims, 7 Drawing Sheets

METHOD AND APPARATUS FOR A DISTRIBUTED CALL SERVICING COMMUNITY

FIELD OF THE INVENTION

The invention relates generally to the field of telecommunications and, in particular, to a method and apparatus for a distributed call servicing community.

BACKGROUND OF THE INVENTION

As the telecommunications industry has grown, new technologies have been introduced to handle the continual increase in call volume recognized by both the telecommunication service providers as well as the companies that take advantage of such telecommunication services. In the past, most telecommunication (i.e. call) processing was completed at a central office typically operated by a large telecommunication company. More recently, corporations and smaller business have begun to invest in and operate smaller switches such as a private branch exchange (PBX). A PBX is a telecommunications system within an organization or enterprise that switches calls between enterprise users on local lines while allowing all users to share a desired number of shared external or trunk lines. The main purpose of a PBX is to save the cost of requiring a line for each user to the telephone company's central office. Additionally, PBXs provide voice mail services to companies as well as other custom calling (i.e. call processing) features, such as call forwarding, call waiting, hunt group designations, and so forth.

Although PBXs may be useful in their own right, many businesses involved with sales and customer support functions require additional call handling and/or processing functionality not provided by an average PBX. A typical call center, for example, includes a collection of resources (including PBXs) that together make or receive high volumes of phone calls. A key component of most call centers is what is referred to as an automatic call distributor (ACD). By using an ACD, an organization can route incoming calls to the appropriate call-handling agents employed by the organization. For example, an organization may employ sales agents to handle sales related calls, or support agents to handle customer support related calls. The ACD could thus be configured to route incoming sales related calls to the organization's sales agents and route the incoming customer support related calls to the organization's support agents.

FIG. 1A illustrates an exemplary call center incorporating the teachings of the prior art. In FIG. 1A, clients 101–103 are shown connected to call center 120 operated by the XYZ company. Call center 120 includes ACD 104, and agents 105–107 each of which are associated with the XYZ company. ACD 104 routes incoming calls received by call center 120 to any of XYZ's agents 105–107 depending upon, for example, each agent's capabilities and/or availability. If all agents are busy attending to other calls and a new call is received by call center 120, the new call may be placed on hold until one of XYZ's agents 105–107 become available. As soon as one of XYZ's agents 105–107 ends a current call, the new call received by call center 120 is routed by ACD 104 to the newly available one of XYZ's agents whether the agent wishes to receive the call or not.

In U.S. Pat. No. 5,884,032, the call routing functionality of an ACD was integrated with services provided by the World Wide Web (WWW) to enable on-line "live help." Specifically, the '032 patent provides a method of establishing two-way voice connectivity between a customer of an organization and a human ACD agent employed by the same organization while sharing common screens of information on a WWW page. Although this may enable more detailed discussions between the organization's customers and agents, it does not provide each agent with the ability to choose whether to provide the requested assistance, nor does it enable an independent agent not associated with the organization to honor the request for assistance.

SUMMARY OF THE INVENTION

An apparatus is provided with a storage medium having stored therein programming instructions that implement a set of communication services for receiving on behalf of a plurality of offeror content providers within a call service community, an indication from an offeree acknowledging acceptance of an offer to provide assistance presented to the offeree by one of the plurality of offeror content providers. In one embodiment, independent agents selectively facilitate assisting offerees based at least in part upon certain attributes specific to the offer and/or the offeree.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for a distributed call servicing community is disclosed herein. In the following description, for purposes of explanation, specific numbers, materials and configurations are set forth in order to provide a thorough understanding of the invention. It will be apparent, however, to one skilled in the art that the invention may be practiced without these specific details. In some instances, structures and devices are shown in block diagram form in order to avoid obscuring the invention. In other instances, well-known features are omitted or simplified in order not to obscure the present invention. For ease of understanding, certain method steps are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
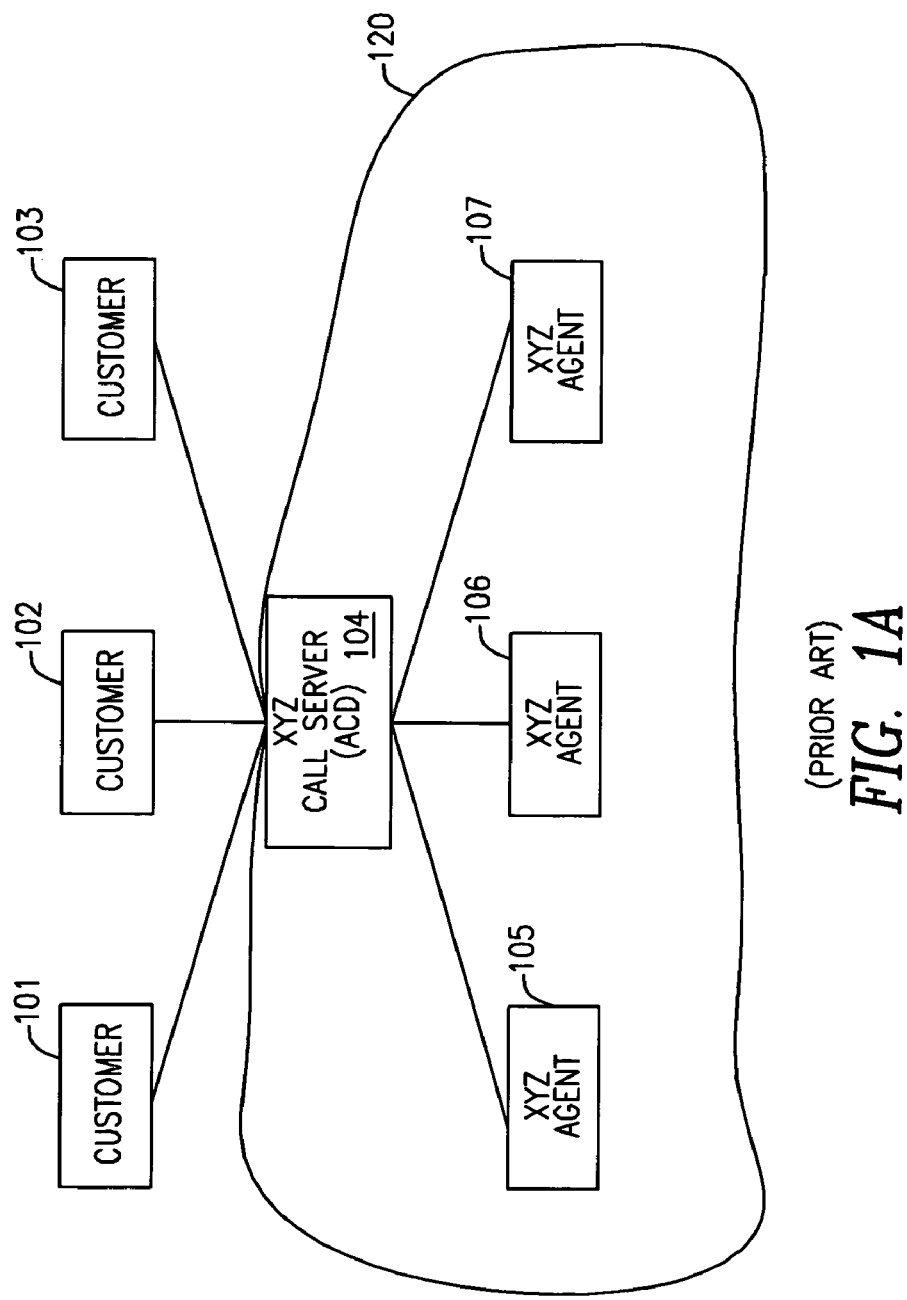
FIG. 1A is a block diagram illustrating a call center according to the prior art.
Figure 1B:
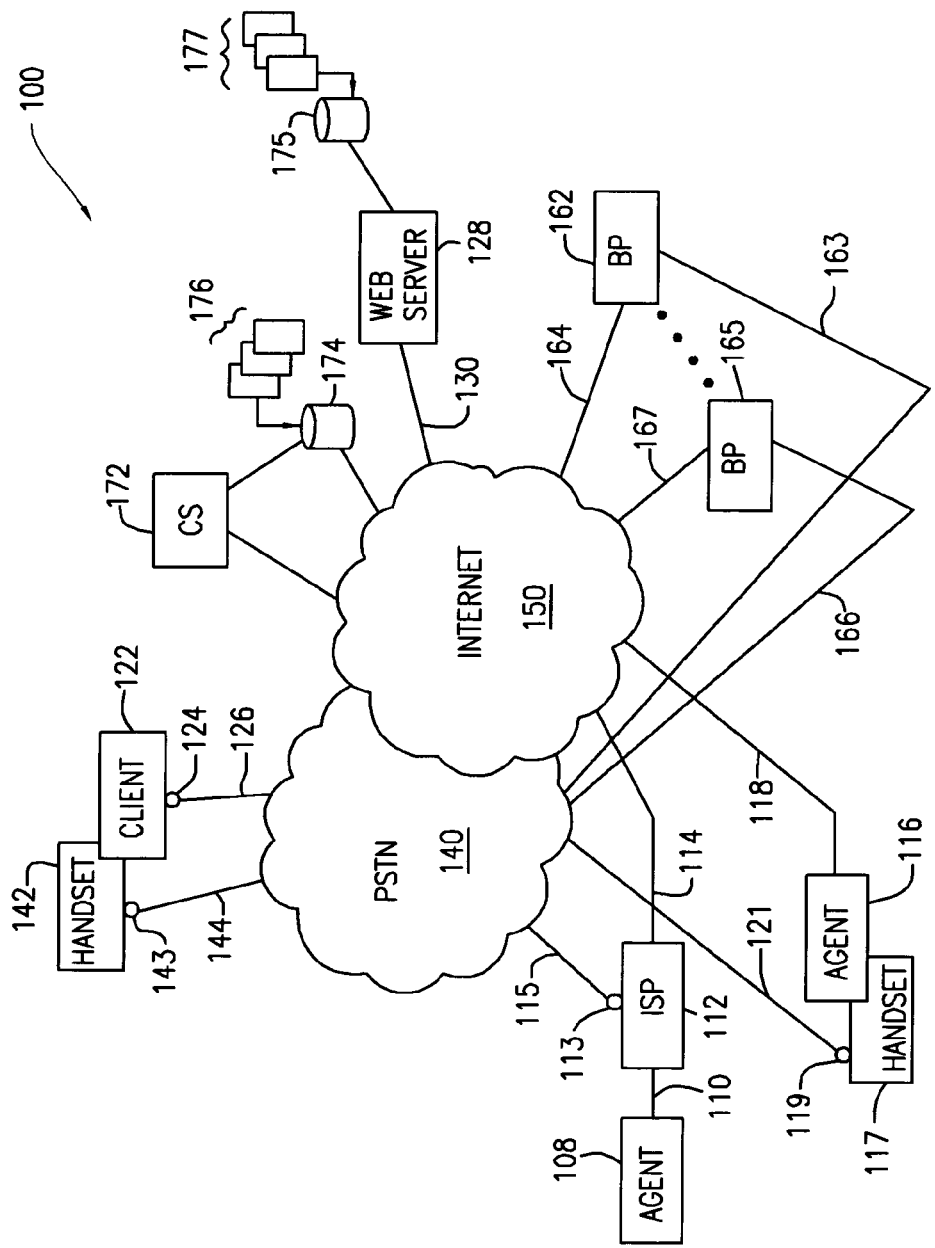
FIG. 1B is a block diagram illustrating an exemplary communication system incorporating the teachings of the invention.

In FIG. 1b, a block diagram is presented illustrating an exemplary call servicing community 100 incorporating the automatic call distribution services of the present invention. While the present invention will be described in the context of this exemplary call servicing community, based on the descriptions to follow, those skilled in the art will appreciate that the present invention is not limited to this embodiment. Referring now to FIG. 1b, client 122, independent agents 108 and 116, handsets 142 and 117, web server 128, bridgeports 162 and 165, call server 172, and data storage devices 174 and 175 including data queues 176 and 177 are communicatively coupled to each other by way of PSTN 140 and Internet 150 as shown.

As is illustrated in FIG. 1b, client 122 is coupled to ISP 112 through PSTN extension 124, communication line 126, PSTN 140, communication line 115, and PSTN extension 113. In turn, ISP 112 is coupled to Internet 150 by direct connection 114. Client 122 is equipped to communicate with ISP 112 through, for example, a modulation/demodulation (MODEM) device (not shown) coupled to PSTN extension 124, while independent agent 108 is equipped with a network interface to communicate with ISP 112 through network connection 110. Rather than being connected to ISP 112, independent agent 116 is directly coupled to Internet 150 using direct connection 118. It should be noted, however, that the various connections between client 122, agent computers 108 and 116, PSTN 140 and Internet 150 described above, are merely illustrative and may vary from that which is described. For example, instead of being directly coupled to Internet 150, independent agent 116 may be connected to Internet 150 through ISP 112 without departing from the spirit and scope of the invention.

Figure 2:
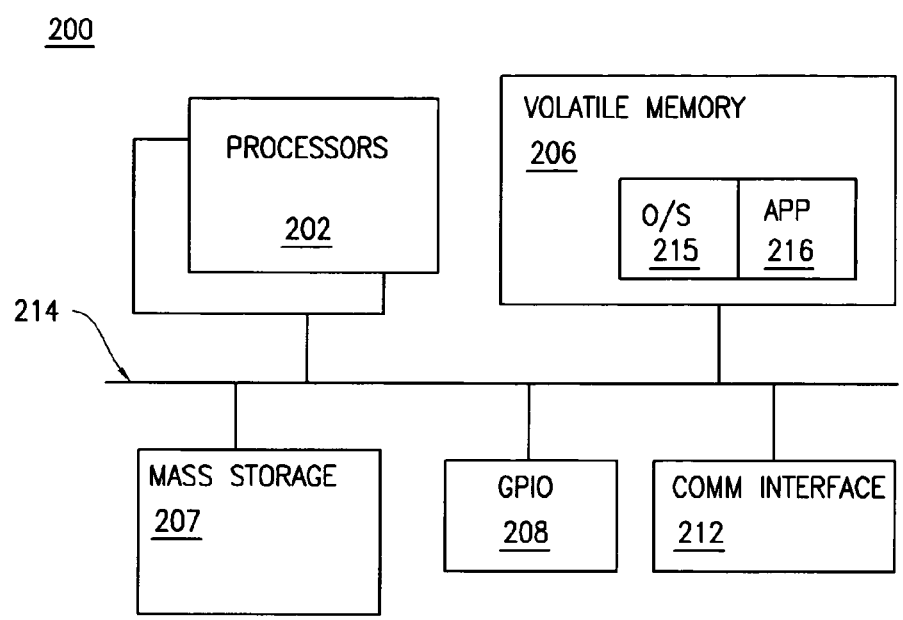
FIG. 2 illustrates an exemplary computer system according to one embodiment of the invention.

Except for the teachings of the present invention (to be more fully described below), client 122, and agent computers 108 and 116 are intended to represent a broad category of computer systems known in the art. FIG. 2 illustrates an example computer system 200 suitable for use by client 122, and independent agents 108 and 116, as well as for use as web server 128, and/or call server 172. As shown, system 200 includes one or more processors 202, such as a PENTIUM™ processor manufactured by Intel Corporation of Santa Clara, Calif.; System memory 206, including both operating system 215, such as WINDOWS™ 95, 98, or 2000 with internetworking communication and socket services, and one or more applications 216; Mass storage devices 207, such as a diskette drive, hard drive, CDROM and so forth; GPIO 208 for interfacing with I/O devices such as a keyboard and cursor control devices, and for inputting, digitizing and compressing outbound audio, and for decompressing and rendering inbound audio; and Communication interfaces 212, such as MODEMs, network interface cards, and so forth for sending and receiving various data packets (including audio data packets) in accordance with certain standard communication protocols. The elements of system 200 are coupled to each other via system bus 214, which may represent multiple buses bridged by one or more bus bridges (not shown). Each of the elements of system 200 performs its conventional functions known in the art. In particular, system memory 204 and mass storage 206 are employed to store a working copy and a permanent copy of the programming instructions implementing the automatic call distribution services of the present invention. Except for the teachings of the present invention, the constitution of the elements shown in FIG. 2 is known, and accordingly will not be further described.

Handsets 142 and 117 are intended to represent a broad category of conventional telephone handsets known in the art, including but not limited to desktop handsets, cordless handsets and wireless handsets. Handset 142, for example, may be replaced by a VoIP telephony device including an independent microphone and speakers or by an integrated microphone and speaker built into client 122 for example. Connectivity to the call center may be through the PSTN network directly or via VoIP through a VoIP gateway such as bridgeports 162 and 165. In FIG. 1B, handset 142 is shown coupled to PSTN 140 through PSTN extension 143 and communication line 144, while handset 117 is coupled to PSTN 140 through PSTN extension 119 and communication line 121. Communication lines 126, 144, 115, and 121 may simply be plain old telephone service (POTS) communication lines, although other types of communication lines may be used. For example, in the case of communication line 126, it may be an integrated service digital network (ISDN) line, whereas in the case of communication line 115, it may be a T1 (1.533 Mbps) or an E1 (2.0488 Mbps) trunk line. Each of communication lines 144 and 121 may be a wireless cellular connection, a Personal Communication Services (PCS) connection, and the like.

PSTN 140 includes a number of Service Switching Points (SSP), Signal Transfer Points (STP), and Service Control Points (SCP) coupled to each other (not shown). PSTN extension 124 is coupled through communication line 126 to a "local" SSP, which in turn is coupled to a number of other "local" PSTN extensions, including for example, PSTN extension 113 if ISP 112 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including for example, extension 119 if handset 117 is a "remote" handset served by a "remote" SSP. As is well known in the art, Internet 150 includes a number of networks interconnected by routers, interconnecting the various client computers, web servers and bridgeports together.

Bridgeports 162 and 165 are coupled to Internet 150 through connections 164 and 167 respectively, and to PSTN 140 through communication lines 163 and 166 respectively. Each of bridgeports 162 and 165 represent a server to determine an appropriate destination PSTN extension, such as the PSTN extension of telephone handset 117 for example, as well as an appropriate one of the community of Internet/PSTN changeover servers (e.g., bridgeports 162 and 165) to place a voice call to a PSTN extension and facilitate the voice call between an independent agent (e.g., independent agent 116) and a client located at a PSTN endpoint, such as handset 117. Further details regarding the functionality of bridgeports 162 and 165 may be found in U.S. Pat. No. 5,889,774, titled "Method and Apparatus for selecting an Internet/PSTN Changeover Server for a Packet Based Phone Call" (having a common assignee with the present application), which is hereby incorporated by reference.

Web server 128 is coupled to Internet 150 through connection 130, but may also be coupled to PSTN 140 by way of additional connections (not illustrated). In one embodiment, web server 128 is a corporate presence web server operated by an Internet content provider for example, and equipped to serve web pages throughout call servicing community 100. In one embodiment, web server 128 serves web pages that include at least one hypertext link (hereafter "hyperlink") representing an offer to provide a browsing user, such as client 122, with assistance. In one embodiment, the user indicates acceptance to the content provider's offer by selecting the offered hyperlink with, for example, a user input device such as a mouse. In one embodiment, the user's act of selecting the hyperlink offered by the content provider on web server 128 causes an entry to be made in at least one data queue, such as data queues 176 and 177, stored within data storage devices 174 and 175 respectively. In one embodiment, an independent agent, such as independent agent 116 who is not employed by the owner and/or operator of web server 128 or call server 172, acts as a knowledge broker within the call servicing community to facilitate the content provider's offer to provide assistance by selectively servicing one or more of the entries within the data queues. In one embodiment, the independent agent charges the offeree (e.g., client 122) a fee for facilitating the assistance, whereas in an alternative embodiment, the independent agent charges the offeror (e.g., content provider) a fee for facilitating the assistance. For the purposes of this disclosure, any content provider that offers assistance through a web page is referred to as an offeror, whereas any user that indicates their acceptance of the offer to provide assistance (i.e., wishes to receive assistance) is referred to as an offeree, and any user unaffiliated with the offeror who facilitates assisting an offeree is referred to as an independent agent.

Except for the teachings of the present invention, call server 172 represents a general purpose computer equipped to manage data queues 176 and 177 as well as data storage devices 174 and 175. In one embodiment, call server 172, and data storage devices 174 and 175 operate as part of a distributed computing system distributed throughout Internet 150. In one embodiment, call server 172, is equipped to receive on behalf of one or more offerors (i.e. content providers), an indication from an offeree acknowledging the offeree's acceptance of an offer for assistance. In one embodiment of the invention, call server 172, in association with call servicing community 100, registers the offeree's indication within at least one of data queues 176 and 177 to be serviced by one or more independent agents (e.g., 108, 116).

Figure 3:
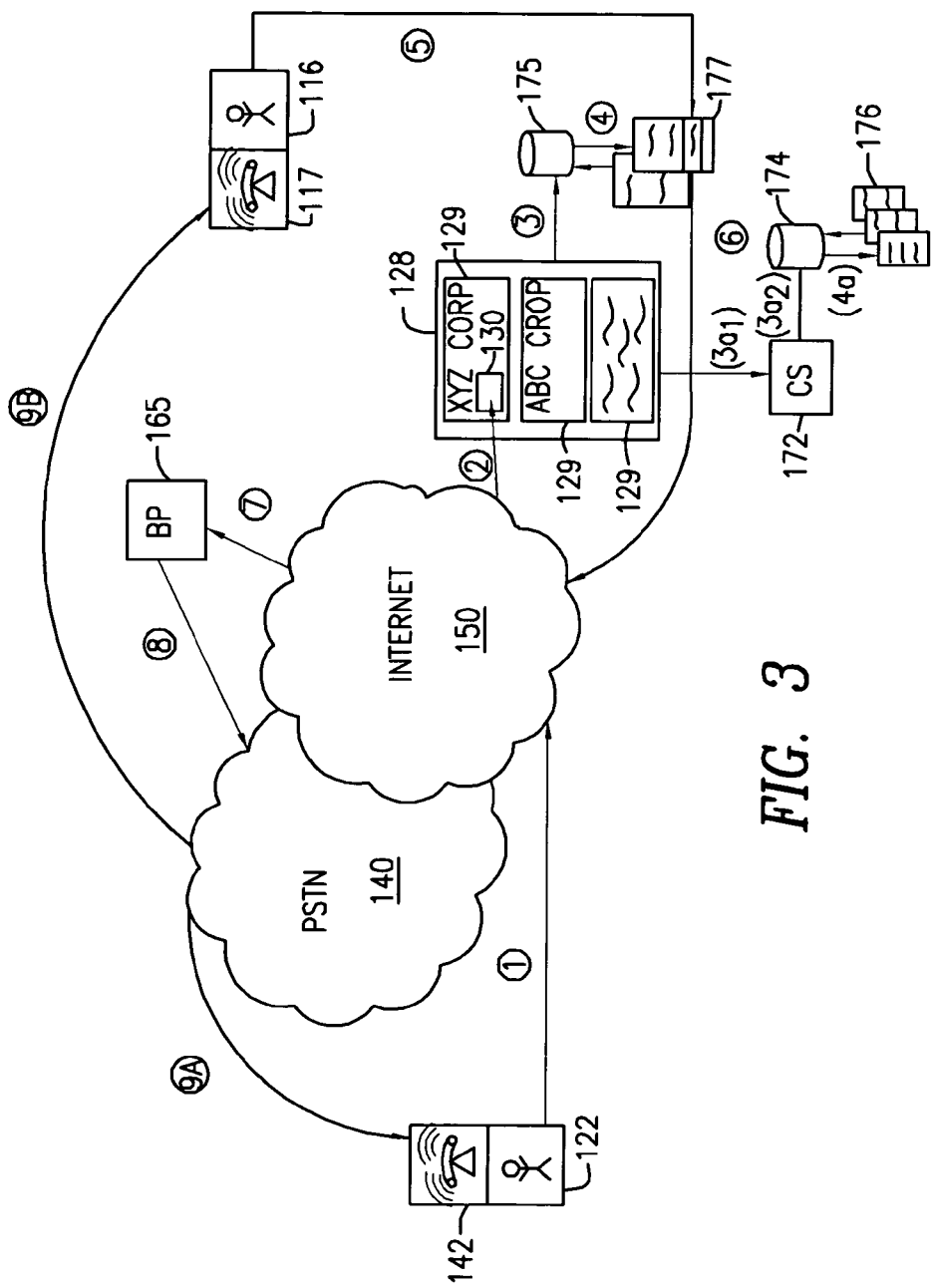
FIG. 3 is a graphical representation illustrating one embodiment of a process flow within the call servicing community of the invention.

FIG. 3 is a graphical representation illustrating one embodiment of a process flow within the call servicing community of the present invention to be described with reference to FIG. 1b. FIG. 3 begins with an offeree (client 122) accessing one or more web pages 129 presented on web server 128 by an offeror content provider over Internet 150. In one embodiment of the invention, the one or more web pages 129 include at least one hyperlink 130 representing an offer from the content provider to assist the offeree (client 122) with, for example, questions the offeree may have that are related to the content provider's web page 129. In one embodiment, the offers for assistance are represented by graphical images, such as buttons associated with the hypertext link, however, text-only links may also be used. In one embodiment, a single content provider presents offers of assistance on behalf of itself, whereas in an alternative embodiment, a content provider presents multiple offers of assistance on behalf of multiple other content providers. In one embodiment, the multiple offers of assistance are organized by the content provider according to the subject matter of the assistance offered. For example, in accordance with one embodiment of the invention, a content provider may provide hypertext offers at strategic locations throughout the provider's web site, such as adjacent to a help icon, adjacent to a product information link, and so forth. By selecting any of these links and acknowledging acceptance to the offer, the offeree is effectively requesting assistance pertaining to a subject represented by the link. By presenting such offers of assistance on behalf of other content providers, the presenting content provider effectively functions as an offer-hosting entity. In one embodiment, the hosting entity is a third party service organization other than the offeror(s) and offeree(s).

Referring once again to FIG. 3, upon viewing one or more web pages 129, the offeree (client 122) indicates their acceptance of the offer for help by selecting and/or activating hyperlink 130. In response to hyperlink 130 being activated, the host of the web page containing the hyperlink (e.g. web server 128) accesses a data storage device (175) having stored therein at least one data queue (177). The web host then registers the offeree's indication of acceptance of the offer in at least one data queue (e.g., data queue 176). Alternatively, web server 128 may transmit a HTTP based request to call server 172 to register the offeree's indication of acceptance of the offer in data queue 176 of data storage device 174. In one embodiment, the offeree's indication is registered along with attributes related to the offer, such as subject matter of the offer, the identity of the offeree, the time at which the offer was accepted by the offeree, and so forth. In accordance with one embodiment of the invention, select ones of the data queues are each associated with a different subject matter and the offeree's indication is registered in a data queue corresponding to the subject matter associated with the offer.

In one embodiment, independent agents acting as a knowledge brokers each associate themselves with one or more data queues. The independent agents can become associated with one or more data queues by, for example, paying a fee to the owners and/or operators of the web host or to some other third party. Assuming independent agent 116 is associated with a data queue that has the offeree's indication stored therein, independent agent 116 may choose to initiate contact with client offeree 122 by selecting the offeree's entry, for example, which is registered in data queue 177 and visible to independent agent 116. In one embodiment, independent agent 116 may opt to communicate with offeree 122 by way of a chat session between the two parties. By opening a chat session first, the independent agent can ascertain the hardware/software configuration of the offeree's computer to determine the level of compatibility between the independent agent's computer and the offeree's computer. If the independent agent determines that the offeree has a voice capable computer, and does not have a spare phone line or does not wish to speak with the agent using a telephone, the independent agent and the offeree may agree to communicate using voice over IP (VoIP).

Furthermore, if independent agent 116 and offeree 122 each have a spare telephone/handset, the parties may opt to communicate through the PSTN. If such is the case, bridgeport 165, for example, would be contacted through the Internet. In response, bridgeport 165 would place a first voice call to PSTN extension 142 of offeree 122, and a second call to PSTN extension 117 of independent agent 116. Bridgeport 165 would then bridge the two calls to place offeree 122 in voice communication with independent agent 116 while the two parties simultaneously remain in data communication with each other. Further information regarding the connection of a PSTN extension through a data network may be found in U.S. Pat. No. 6,026,087, titled Method and Apparatus for Establishing a Voice Call to a PSTN Extension for a Networked Computer, and contemporaneously filed U.S. Pat. No. 6,865,161, titled "Method and Apparatus for Establishing a Voice Call by Way of an Electronic Mail Message", (both having a common assignee with the present application).

Figure 4:
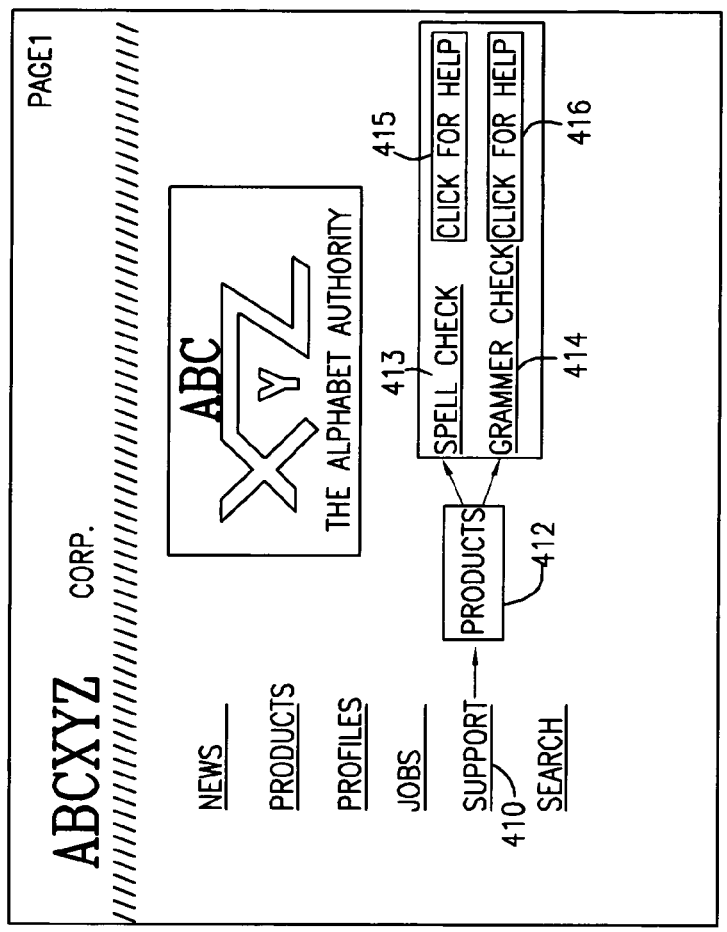
FIG. 4 is a graphical representation illustrating a first embodiment of a web page incorporating the teachings of the invention.

FIG. 4 is a graphical representation illustrating a first embodiment of a web page incorporating the teachings of the present invention. Web page 400 is shown containing both graphical and textual information related to the "ABCXYZ" Corporation, a hypothetical content provider. Displayed along the left hand side of web page 400 are six hyperlinked headings including: News, Products, Profiles, Jobs, Support, and Search. Except for the teachings of the present invention, the method of creating the hyperlinks shown in web page 400 are known in the art and will not be discussed further. "Support" hyperlink 410 represents a hyperlink associated with subject matter related to product support issues. "Support" hyperlink 410, however, could also be associated with other subject matters, such as, purchasing and product support issues, technical support issues, and the like. Selecting or activating "support" hyperlink 410 displays "products" hyperlink 412. Similarly, by selecting "products" hyperlink 412, "spell check" hyperlink 413 and "grammar check" hyperlink 414 are displayed. The selection of each hyperlink may cause a new web page to be displayed providing additional information to the browsing user, or the selection of each hyperlink may simply cause additional hyperlinks to be displayed on the currently displayed page as is illustrated in FIG. 4.

In accordance with one embodiment of the invention, each of "spell check" hyperlink 413 and "grammar check" hyperlink 414 is associated with a button representing an offer to provide assistance (e.g., "click for help" button 415 and "click for help" button 416). According to one embodiment of the invention, by selecting either of "click for help" button 415 and "click for help" button 416, the user/client becomes an accepting offeree to the web site host's offer to provide assistance. The offeree's acceptance of the offer (indicated by the user's selection of the button) is then registered in one or more data queues having a prior association with the subject matter of "click for help" button 415. Once the offeree's acceptance is registered, any one of a number of independent agents may serve to facilitate the offeree's requested assistance regardless of the independent agents' geographical location or employer(s).

Figure 5:
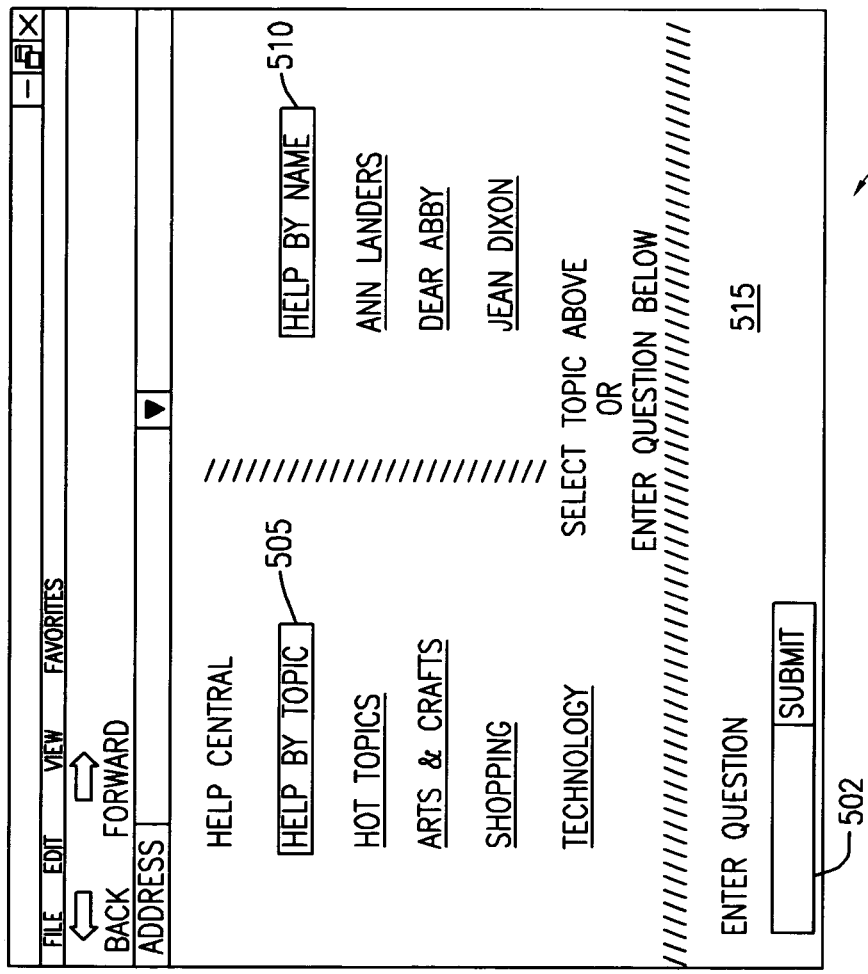
FIG. 5 is a graphical representation illustrating a second embodiment of a web page incorporating the teachings of the present invention.

FIG. 5 is a graphical representation illustrating a second embodiment of a web page incorporating the teachings of the present invention. Web page 500 is displayed with both graphical and textual data related to a service entitled "Help Central." In one embodiment, the Help Central service is provided by a third party organization that displays on its web page(s) numerous hyperlinks on behalf of multiple content providers (i.e., offerors). In one embodiment, the third party organization hosts offers presented by various content providers and categorizes the offers according to subject matter in exchange for a fee. In one embodiment, the fee is paid by the content provider (offeror), whereas in an alternative embodiment, at least part of the fee is paid by the client (offeree).

The Help Central web page 500 is divided into multiple sections including a "help by topic" section 505, a "help by name" section 510, and a "free form entry" section 515. Although only four hyperlinks are shown under the "help by topic" section 505, many additional links may nonetheless be present. The "help by topic" section includes hyperlinks that have been associated with and organized according to various subject matters including hot topics, arts &crafts, shopping, technology, and so forth. The "hot topics" hyperlink, for example, is intended to provide potential offerees with information related to current events and important topics of discussion. By selecting the "hot topics" hyperlink, potential offerees may be presented with additional narrower topics, or they may be presented with a single hyperlink representing an offer to provide assistance. Similarly, if a potential offeree were to select the "Ann Landers" hyperlink under help by name section 510, a list of additional hyperlinked subtopics may appear, or alternatively, a hyperlink corresponding to an offer to provide assistance may appear whereby the assistance would be facilitated by Ann Landers.

Shown towards the bottom of web page 500 is "free form" entry section 515 including "enter question" text entry box 502. In accordance with one embodiment of the invention, an offeree may enter a free-form question into text entry box 502 rather than selecting from the predefined list of subject matters described above. An offeree would enter a text string into the text entry box and select the "submit" button. The text string is interpreted, and a rules-based matching scheme is employed to categorize the question into one or more acceptable (i.e., preexisting) subject matters or topics. If a subject matter is not discernable from the text based question or the subject matter does not already exist, the offeree may be prompted to reenter the question or web server 128, for example, can be made to return a result that most closely approximates one or more previously identified subject matters. In an alternative embodiment, a new subject matter description and associated data queue may be dynamically created within data storage device 175 for example, to service the offeree's question.

Figure 6:
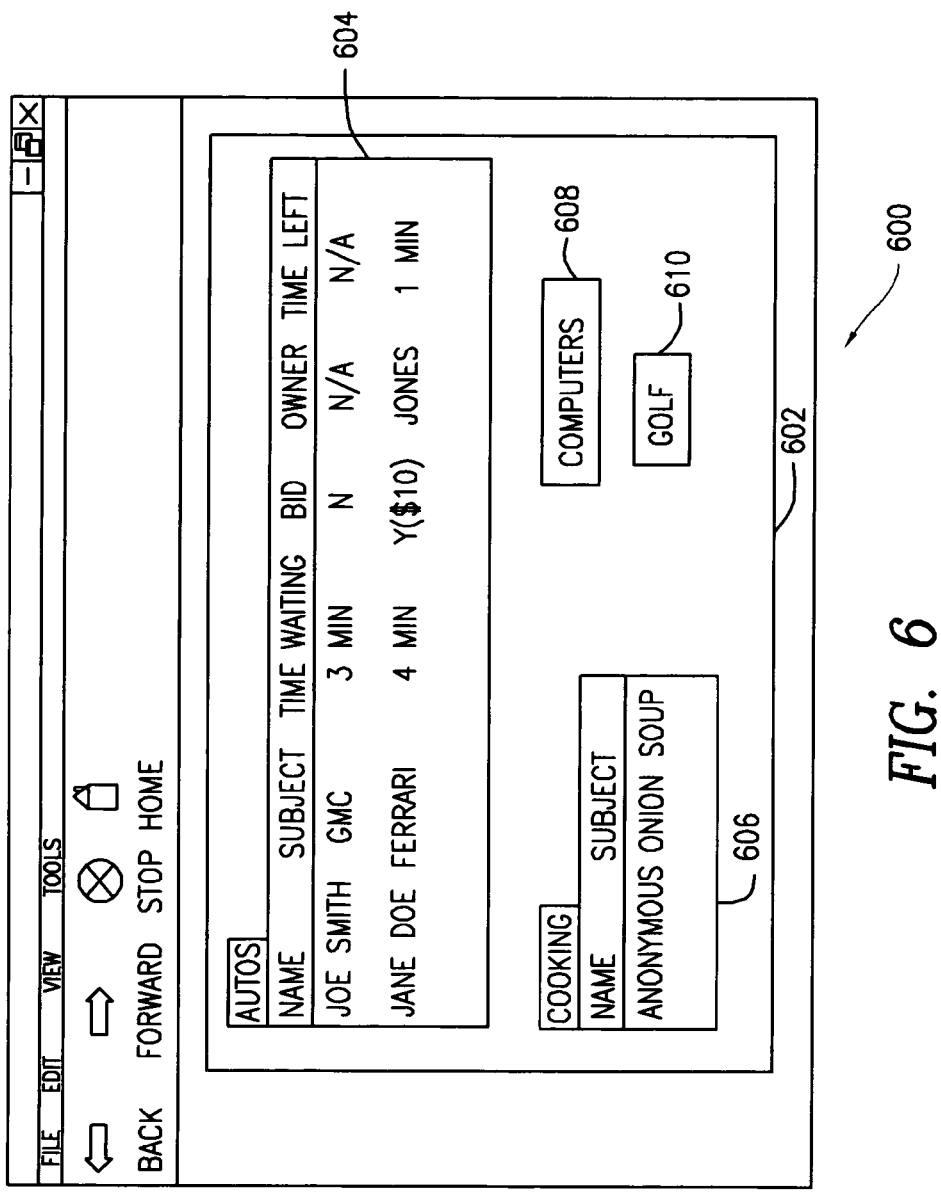
FIG. 6 is a graphical representation of a web browser illustrating multiple data queues in accordance with one embodiment of the invention.

Once an offeree's acceptance of an offer is registered within a data queue, one or more independent agents may selectively offer their assistance to the offeree by selecting, for example, a graphical representation of the offeree's entry within the queue. FIG. 6 is a graphical representation of a web browser illustrating how multiple data queues may be contemporaneously presented to an independent agent in accordance with one embodiment of the invention. Web browser 600 is shown including web page 602, and data queues 604, 606, 608 and 610. In one embodiment, each data queue is displayed as its own window within web browser 600, however, each queue may also be represented by a corresponding selectable icon displayed within web page 602.

Data queue 604 is titled "autos" and includes requests for assistance from offerees who have submitted questions related to automobiles. Similarly, data queue 606 includes one request related to "cooking", whereas data queues 608 and 610 are currently empty. In one embodiment, only data queues that contain active entries are displayed upon the independent agent's desktop. Similarly, in one embodiment, only those queues that an independent agent has permission to view are displayed upon the agent's desktop. In one embodiment independent agents contract with a third party service organization to associate themselves with a particular data queue and/or obtain queue viewing permissions.

Data queue 604 illustrates an example of how independent agents are able to selectively facilitate assisting offerees. In addition to the offeree's name appearing within the queue, data queue 604 displays additional attributes associated with the specific queue entry. For example, the first entry shows that an offeree (e.g., Joe Smith) has a question related to GMC autos, and that he has been waiting for assistance for 3 minutes. Depending upon the independent agent's knowledge base or the length of time an offeree has been waiting in the queue, the independent agent may elect to assist Joe Smith, Jane Doe, or neither. In any event, the choice is up to the independent agent.

In an alternative embodiment, independent agents are provided with the ability to bid for the right or privilege to assist an offeree. For example, merchants of an electronic shopping mall may present offers to provide assistance to potential buyers (i.e., shoppers) of various goods offered by the merchants. Each independent agent may then bid to be awarded the right to facilitate assisting a particular offeree. In one embodiment, the independent agent may have a contractual agreement with one or more merchant such that the independent agent receives a fee, whether it be fixed or calculated as a percentage of a sale to be facilitated by the independent agent, in exchange for the independent agent providing assistance to the offeree. In the event the independent agent receives a percentage of all sales for which the independent agent helps facilitate, the independent agent may be more inclined to facilitate (by e.g. submitting a higher bid) an offeree shopping for an exotic sports car rather than an offeree shopping for a budget conscious commuter car. For example, in data queue 604 Jane Doe has indicated that she is willing to let multiple independent agents bid for the privilege to assist her, she has a question related to a Ferrari, she has been waiting for 4 minutes, the current bid stands at $10 offered by Jones, and there is one minute remaining in the "auction". In one embodiment, the offeree (e.g., Jane Doe) earns a portion of the proceeds for her willingness to allow bidding on her question. In one embodiment, each independent agent who wishes to facilitate assisting an offeree may bid for the right to assist an offeree using services or merchandise rather than currency. For example, one local independent agent may submit a bid to perform yard work for the offeree, whereas another independent agent may offer to facilitate assisting the offeree in exchange for surplus computer equipment having little value to the independent agent but having potentially great value to the offeree. In an alternative embodiment, an offeree may offer currency and/or merchandise for the independent agents to bid on in exchange for the assistance to be provided by the independent agents.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer system comprising:
a storage medium having stored therein a plurality of programming instructions to implement a set of communication services for receiving on behalf of a plurality of offeror content providers, an indication from an offeree acknowledging acceptance of an offer to provide assistance presented to the offeree by one of the plurality of offeror content providers, the communications services further comprising services for registering said indication in one or more data queues, and services for allowing one or more agents to select said registered indication from said data queues so as to facilitate said assistance; and
an execution unit coupled to the storage medium for executing the plurality of programming instructions;
wherein the assistance is selectively facilitated by one of the plurality of agents based upon a value assigned to the assistance by the plurality of agents, and the value is a monetary value.

2. The computer system of claim 1, wherein said indication is registered in the data queues regardless of availability of the agents.

3. The computer system of claim 2, wherein the data queue is provided by a data storage device of a call server, and the selection of said indication by an agent triggers a communication session between said offeree and the agent selecting the indication.

4. The computer system of claim 2, wherein select ones of the plurality of data queues are each associated with one or more subject matters.

5. The computer system of claim 4, wherein the indication from the offeree is generated in response to the offeree selecting a hyperlink displayed in association with a web page sponsored by at least one of the offeror content providers.

6. The computer system of claim 5, wherein the indication is registered in a data queue having a subject matter that corresponds to a topic associated with the hypertext link.

7. The computer system of claim 4, wherein the indication from the offeree is generated in response to the offeree selecting one of a plurality of hypertext links displayed by the computer system in association with a web page sponsored by the offeror content providers.

8. The computer system of claim 1, wherein the indication from the offeree comprises the form of an electronic question posed by the offeree in association with content provided by one of the plurality of offeror content providers, and corresponding to at least one of a plurality of subject matters.

9. The computer system of claim 8, wherein the data queues are topically organized and are dynamically generated based at least in part upon the one or more subject matters determined to be associated with the electronic question.

10. The computer system of claim 9, wherein the assistance is selectively facilitate by one of the plurality of agents based upon the one or more subject corresponding to the electronic question.

11. The computer system of claim 1, wherein the plurality of agents bid against each other to obtain a right to facilitate the assistance.

12. A computer system comprising:
a storage medium having stored therein a plurality of programming instructions to implement a set of communication services on the computer system for offering assistance to an offeree on behalf o an offeror, the communications services further comprising sercies for receiving an indication from the offeree acknowledging acceptance of said offer, services for registering said indication in one or more data queues, and services for allowing at least one of a plurality of agents to select said registered indication from said data queues so as to facilitate said assistance; and
an execution unit coupled to the storage medium for executing the plurality of programming instructions;
wherein the assistance is selectively facilitated by one of the plurality of agents based upon a value assigned to the assistance by the plurality of agents, and the value is a monetary value.

13. The computer system of claim 12, wherein said indication is registered in the data queues regardless of availability of the agents.

14. The computer system of claim 13, wherein the data queue is provided by a data storage device of a call server, and the selection of said indication by an agent triggers a communication session between said offeree and the agent selecting the indication.

15. The computer system of claim 13, wherein select ones of the plurality of data queues are each associated with a topical subject matter.

16. The computer system of claim 15, wherein the indication of the offeree's acceptance is generated in response to the offeree selecting a hyperlink displayed in association with a web page sponsored by the offeror.

17. The computer system of claim 16, wherein the indication is registered in a data queue having a topical subject matter that corresponds to a topic associated with the hypertext link.

18. The computer system of claim 15, wherein the indication of the offeree's acceptance is generated in response to the offeree selecting one of a plurality of hypertext links displayed by the computer system in association with a web page sponsored by the offeror.

19. The computer system of claim 12, wherein the indication from the offeree comprises the form of an electronic question posed by the offeree in association with content provided by the offeror, and corresponding to at least one of a plurality of subject matters.

20. The computer system of claim 19, wherein the data queues are topically organized and are dynamically generated based at least in part upon the one or more subject matters determined to be associated with the electronic question.

21. The computer system of claim 20, wherein the assistance is selectively facilitated by one of the plurality of agents based upon the one or more subject matters corresponding to the electronic question.

22. The computer system of claim 12, wherein the plurality of agents bid against each other to obtain a right to facilitate the assistance.

23. A computer system comprising:
a web server for presenting an offer of assistance to an offeree on behalf of an offeror content provider;
means for registering said indication in one or more data queues; and
means for allowing at least one of a plurality of agents to select the registered indication from the data queues so as to facilitate said assistance;
wherein the assistance is selectively facilitated by one of the plurality of agents based upon a value assigned to the assistance by the plurality of agents, and the value is a monetary value.

24. The computer system of claim 23, wherein said indication is registered in the data queues regardless of availability of the agents.

25. The computer system of claim 24, wherein the data queues are each associated with subject matters.

26. The computer system of claim 24, wherein acknowledging acceptance of the offer further comprises transmitting an indicator to the offeror content provider.

27. The computer system of claim 26, wherein the indication from the offeree is generated in response to the offeree selecting a hyperlink displayed in association with a web page sponsored by the offeror content provider.

28. The computer system of claim 27, wherein the indication is registered in a data queue having a topical subject matter that corresponds to a topic associated with the hypertext link.

29. The computer system of claim 25, wherein the indication from the offeree is generated in response to the offeree selecting one of a plurality of hypertext links displayed by the web server in association with a web page sponsored by the offeror content provider.

30. The computer system of claim 23, wherein the indication from the offeree comprises the form of an electronic question posed by the offeree in association with content provided by the offeror content provider, and corresponding to at least one of a plurality of subject matters.

31. The computer system of claim 30, wherein the data queues are topically organized and are dynamically generated based at least in part upon the one or more subject matters determined to be associated with the electronic question.

32. The computer system of claim 31, wherein the assistance is selectively facilitated by one of the plurality of agents based upon the one or more subject matters corresponding to the electronic question.

33. The computer system of claim 23, wherein the plurality of independent agents bid against each other to obtain a right to facilitate the assistance.

34. A computer system comprising:
a storage medium having stored therein a plurality of programming instructions to implement a set of communication services for receiving on behalf of a plurality of offeror content providers, an indication from an offeree acknowledging acceptance of an offer to provide assistance presented to the offeree by one of the plurality of offeror content providers, the communications services further comprising services for registering said indication in one or more data queues, and services for allowing one or more agents to select said registered indication from said data queues so as to facilitate said assistance; and
an execution unit coupled to the storage medium for executing the plurality of programming instructions;
wherein the assistance is selectively facilitated by one of the plurality of agents based upon a value assigned to the assistance by the plurality of agents, and the plurality of agents bid against each other to obtain a right to facilitate the assistance.

35. The computer system of claim 34, wherein said indication is registered in the data queues regardless of availability of the agents.

36. The computer system of claim 35, wherein the data queue is provided by a data storage device of a call server, and the selection of said indication by an agent triggers a communication session between said offeree and the agent selecting the indication.

37. The computer system of claim 35, wherein select ones of the plurality of data queues are each associated with one or more subject matters.

38. The computer system of claim 37, wherein the indication from the offeree is generated in response to the offeree selecting a hyperlink displayed in association with a web page sponsored by at least one of the offeror content providers.

39. The computer system of claim 38, wherein the indication is registered in a data queue having a subject matter that corresponds to a topic associated with the hypertext link.

40. The computer system of claim 37, wherein the indication from the offeree is generated in response to the offeree selecting one of a plurality of hypertext links displayed by the computer system in association with a web page sponsored by the offeror content providers.

41. The computer system of claim 34, wherein the indication from the offeree comprises the form of an electronic question posed by the offeree in association with content provided by one of the plurality of offeror content providers, and corresponding to at least one of a plurality of subject matters.

42. The computer system of claim 41, wherein the data queues are topically organized and are dynamically generated based at least in part upon the one or more subject matters determined to be associated with the electronic question.

43. The computer system of claim 42, wherein the assistance is selectively facilitate by one of the plurality of agents based upon the one or more subject corresponding to the electronic question.

44. A computer system comprising:
   a storage medium having stored therein a plurality of programming instructions to implement a set of communication services on the computer system for offering assistance to an offeree on behalf o an offeror, the communications services further comprising sercies for receiving an indication from the offeree acknowledging acceptance of said offer, services for registering said indication in one or more data queues, and services for allowing at least one of a plurality of agents to select said registered indication from said data queues so as to facilitate said assistance; and
   an execution unit coupled to the storage medium for executing the plurality of programming instructions;
   wherein the assistance is selectively facilitated by one of the plurality of agents based upon a value assigned to the assistance by the plurality of agents, and the plurality of agents bid against each other to obtain a right to facilitate the assistance.

45. The computer system of claim 44, wherein said indication is registered in the data queues regardless of availability of the agents.

46. The computer system of claim 45, wherein the data queue is provided by a data storage device of a call server, and the selection of said indication by an agent triggers a communication session between said offeree and the agent selecting the indication.

47. The computer system of claim 45, wherein select ones of the plurality of data queues are each associated with a topical subject matter.

48. The computer system of claim 47, wherein the indication of the offeree's acceptance is generated in response to the offeree selecting a hyperlink displayed in association with a web page sponsored by the offeror.

49. The computer system of claim 48, wherein the indication is registered in a data queue having a topical subject matter that corresponds to a topic associated with the hypertext link.

50. The computer system of claim 47, wherein the indication of the offeree's acceptance is generated in response to the offeree selecting one of a plurality of hypertext links displayed by the computer system in association with a web page sponsored by the offeror.

51. The computer system of claim 44, wherein the indication from the offeree comprises the form of an electronic question posed by the offeree in association with content provided by the offeror, and corresponding to at least one of a plurality of subject matters.

52. The computer system of claim 51, wherein the data queues are topically organized and are dynamically generated based at least in part upon the one or more subject matters determined to be associated with the electronic question.

53. The computer system of claim 52, wherein the assistance is selectively facilitated by one of the plurality of agents based upon the one or more subject matters corresponding to the electronic question.

* * * * *